United States Patent [19]
Zarouri et al.

[11] Patent Number: 5,138,507
[45] Date of Patent: Aug. 11, 1992

[54] DISK HEAD ASSEMBLY FLEXURE WITH IMPROVED MOTION STABILITY

[75] Inventors: Mourad Zarouri, San Diego; Carl J. Carlson; Warren Coon, both of Poway, all of Calif.

[73] Assignee: Computer & Communications Technology Corp., San Diego, Calif.

[21] Appl. No.: 572,059

[22] Filed: Aug. 23, 1990

Related U.S. Application Data

[63] Continuation-in-part of Ser. No. 328,869, Mar. 27, 1989, Pat. No. 5,008,768.

[51] Int. Cl.$^5$ .......................... G11B 5/48; G11B 21/16
[52] U.S. Cl. ..................................................... 360/104
[58] Field of Search ......................................... 360/104

[56] References Cited
U.S. PATENT DOCUMENTS
4,991,045 2/1991 Oberg .................................. 360/104

*Primary Examiner*—A. J. Heinz
*Attorney, Agent, or Firm*—Spensley Horn Jubas & Lubitz

[57] ABSTRACT

A flexure for supporting a slider/electromagnetic read/write head assembly for a rotary actuator-type disk drive. The flexure is designed to improve yaw stiffness while simultaneously improving pitch and roll compliance compared to prior art designs. The flexure has a support structure having a pair of forked outriggers. Attached at the end of each outrigger arm is a spaced-apart flexure tongue structure. The width of the flexure at the connection between the tongue and outriggers is less than the width of the flexure at the connection between the support structure and outriggers. A gimbaling dimple is provided on the tongue structure that is positioned such that when a slider is mounted on the flexure, the dimple is positioned at approximately the center of pressure of the slider. As a result of the inventive design, the position of the gimbaling dimple can be moved substantially forward along the flexure, thereby permitting the use of a notched slider assembly, resulting in an overall decrease in the height of the flexure/slider combination.

10 Claims, 3 Drawing Sheets

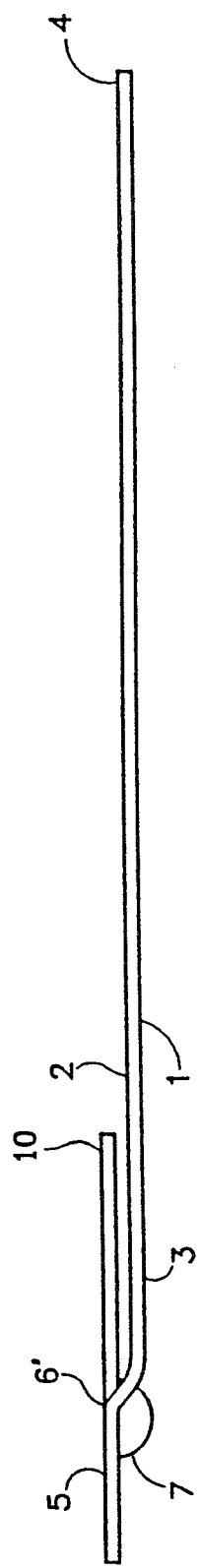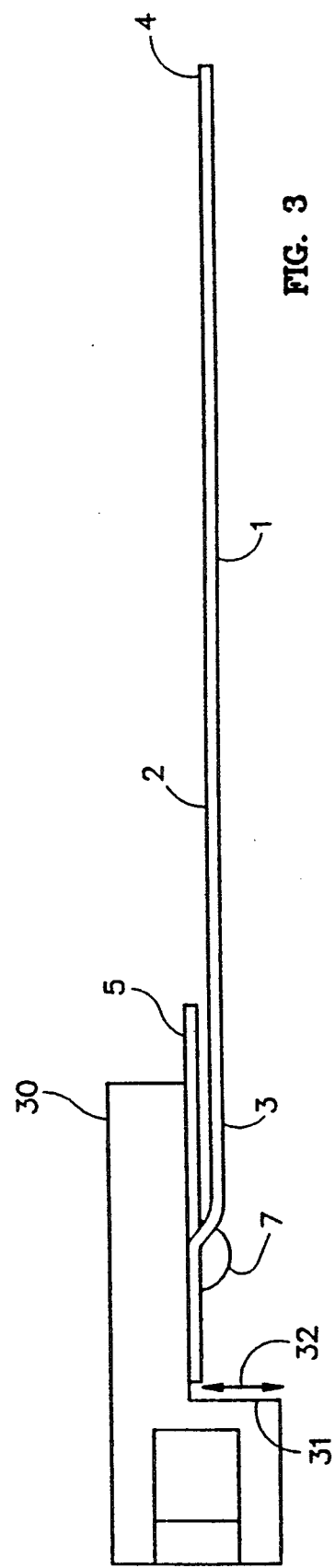

DISK HEAD ASSEMBLY FLEXURE WITH IMPROVED MOTION STABILITY

CROSS-REFERENCE TO RELATED APPLICATION

This application is a continuation-in-part of application Ser. No. 07/328,869, filed Mar. 27, 1989, now U.S. Pat. No. 5,008,768.

BACKGROUND OF THE INVENTION

1. Field of the Invention

This invention relates to computer disk head assemblies, and more particularly to a computer disk head assembly flexure having improved mechanical characteristics.

2. Related Art

Magnetic disk drives have become an important part of the computer industry. Typical modern magnetic disk drives have a plurality of flat, circular, spaced apart disks rotating about a common spindle. Data is stored on a magnetic media formed on the surface of the disks. Data is divided into groupings called "tracks" that form concentric rings on the surface of the disks. A read/write head is positioned above each side of a disk. As the disk spins beneath a head, the head can magnetize the magnetic media in a track, thereby writing onto the track. After data is stored on a track, the read/write head can be positioned above a track, and as the disk spins, the head can read back the magnetic pattern stored on the disk track. To write on or to read from different tracks, the read/write heads merely need to be moved towards or away from the spindle.

The read/write heads typically comprise an electromagnetic core and coil mounted on a "slider" which has an air-bearing surface positioned immediately adjacent the flat surface of a disk. As the disk spins, the air following the disk applies pressure to the slider's air-bearing surface, and lifts the slider and read/write core and coil off of the surface of the disk.

The disk surfaces of disk drives are not perfectly flat, yet it is important that the air-bearing surface of the slider be substantially parallel to the disk surface. Therefore, the slider body is attached to a component called a flexure. A flexure allows the slider body to gimbal to follow fluctuations in the surface of a disk while restricting the slider's motion in undesired directions with respect to the disk. To support a flexure in the proper position, the flexure is attached to an elongated load beam which in turn is attached to an arm coupled to a carriage in the disk drive. The load beam is generally made of steel and acts as a leaf spring to bias the flexure/slider assembly towards a disk.

Over the past several years, the size of disk drives has shrunken considerably, from a 14-inch form factor down to as little as a 2½-inch form factor at present. While the physical size of disk drives has been shrinking, the density of information storage on the disks of such disk drives has been increasing. Both the number of bits per inch (bpi) and tracks per inch (tpi) have increased significantly over the past several years. Furthermore, the speed of access of the head assembly from track to track in such disk drives has also been increasing, resulting in higher performance disk drives.

As a result of such changes, it has become increasingly important to design computer disk head assemblies to higher levels of functional precision in order to maintain the correct position of read/write heads with respect to data tracks. An important aspect of such assemblies is the flexure.

FIG. 1 shows a prior art flexure 1. The flexure 1 comprises a "tuning fork" shaped support structure 2 having a pair of outriggers 3. The attachment end 4 of the flexure 1 is attached to a load beam 10 (see FIG. 1a) of the disk drive head assembly structure.

The flexure 1 has an "I" shaped tongue portion 5 that is attached to the inner sides of the ends of the outriggers 3 by ramps 6 such that the tongue 5 is spaced apart therefrom by the height of the ramps 6. The ramps serve to separate the outriggers 3 from the slider that will be attached to the tongue 5.

A raised, rounded dimple 7 is provided in the tongue 5 such that when the flexure 1 is attached to a load beam 10, the apex of the dimple 7 rests against the load beam 10. This provides a pivot or gimbal point around which a slider, when mounted to the tongue 5 of the flexure 1, can pitch and roll with respect to the longitudinal and transverse axes, respectively, of the flexure 1. This permits the flexure—and thus the read/write head on the slider attached to the flexure—to follow fluctuations in the surface of a disk while restricting the slider's motion in undesired directions with respect to the disk.

Prior art flexures of the type shown in FIGS. 1 and 1a are typically used with a radial-type actuator, which moves the head assembly towards and away from the disk spindle along a radius of the disk. When a prior art type flexure is used with a radial-type actuator, the longitudinal axis of the slider is perpendicular to the longitudinal axis of the flexure structure 1. The outriggers 3 of the flexure structure 1 permit the slider to follow the surface of an adjacent magnetic disk such that the spacing between the read/write head on the slider and the disk is maintained at an approximate constant distance.

In many present-day disk drive designs, rotary-type actuators are used instead of radial actuators. A rotary actuator moves the head assembly towards and away from the disk spindle along an arcuate path, much like the path of a pivoting tonearm on a record player.

A major problem in using prior art flexures of the type shown in FIG. 1 in a rotary type actuator is that the relationship of the slider (and hence read/write head) to the flexure is changed by 90°. That is, in radial actuators, the longitudinal axis of the slider is perpendicular to the longitudinal axis of the flexure 1. In a rotary actuator, the longitudinal axis of the rotary actuator is tangential to the disks, rather than perpendicular. Thus, the slider must be positioned such that its longitudinal axis is parallel with the longitudinal axis of the flexure 1. However, since a rotary actuator moves the slider/head assembly in a arcuate path in order to move from track to track, a problem arises that did not exist with radial actuators. As the rotary actuator moves a head from side to side, a yaw motion is imparted to the slider/head assembly that is not adequately countered by the outriggers 3 of prior art flexures. The position of the ramps 6 of the prior art flexure 1 do not provide adequate stiffness against such yawing.

Yaw of a read/write head flexure is undesirable, because a head may have difficulty settling on track or remaining on track after a seek operation, thereby impairing reading or writing of data.

It is therefore desirable to provide a flexure that is designed to pitch and roll with respect to the direction of rotation of a disk while limiting yaw.

Another problem in using the prior art flexures in a rotary actuator is that the prior art flexure is not adequately compliant in the roll direction, thus interfering with the roll compliance of the slider air bearing.

SUMMARY OF THE INVENTION

The invention comprises an improved flexure for supporting a slider/electromagnetic read/write head assembly for a rotary actuator-type disk drive. The inventive flexure is designed to improve yaw stiffness while simultaneously improving pitch and roll compliance compared to prior art designs. These goals are accomplished by providing a flexure with a support structure having a pair of forked outriggers. Attached at the end of each outrigger arm is a spaced-apart flexure tongue structure. The width of the flexure at the connection between the tongue and outriggers is less than the width of the flexure at the connection between the support structure and outriggers. A gimbaling dimple is provided on the tongue structure that is positioned such that when a slider is mounted on the flexure, the dimple is positioned at approximately the center of pressure of the slider. As a result of the inventive design, the position of the gimbaling dimple can be moved substantially forward along the flexure, thereby permitting the use of a notched slider assembly, resulting in an overall decrease in the height of the flexure/slider combination.

BRIEF DESCRIPTION OF THE DRAWINGS

FIG. 2a is a side view of the inventive flexure shown in FIG. 2.

FIG. 3 is a side view of the inventive flexure shown in combination with a notched slider assembly.

Like reference characters in the various drawings refer to like elements.

DETAILED DESCRIPTION OF THE PREFERRED EMBODIMENT

Figure 1:
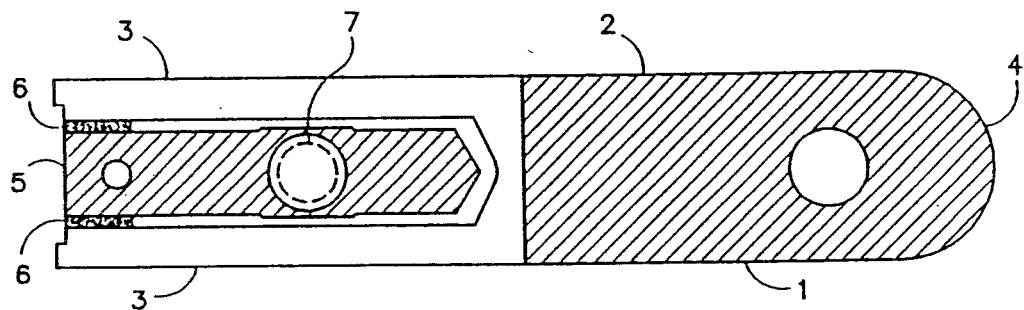
FIG. 1 is a top plan view of a prior art flexure.
Figure 1A:
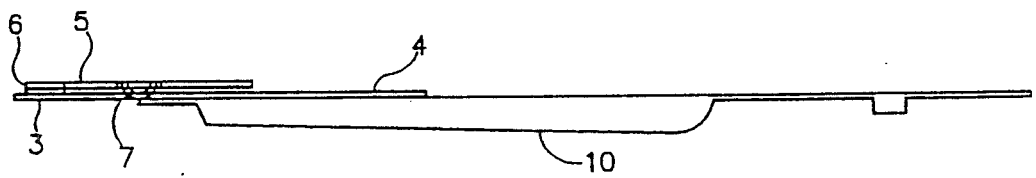
FIG. 1a is a side view of the prior art flexure shown in FIG. 1, and showing an attached load beam.
Figure 2:
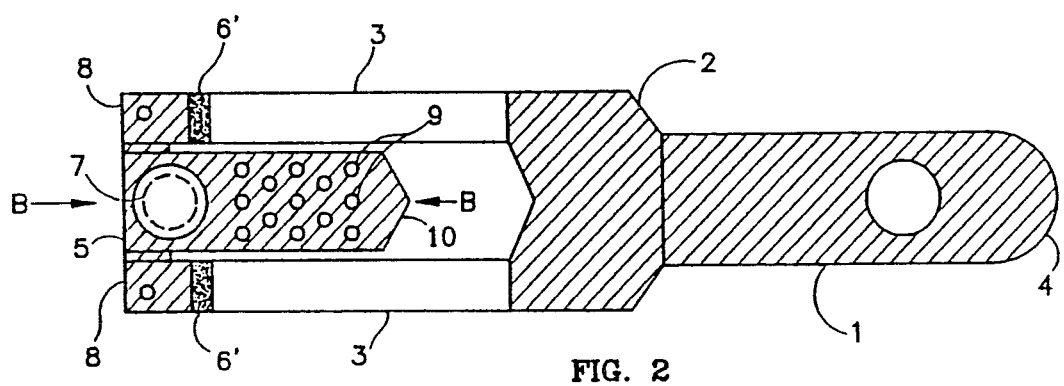
FIG. 2 is a top plan view of a flexure in accordance with the present invention.

FIG. 2 shows a top plan view of the preferred embodiment of the present invention. The flexure structure 1 comprises a "Y" or "tuning fork" shaped support structure 2 having an attachment end 4 and a pair of outriggers 3. The shape of the support structure 2 reduces the mass of the flexure 1 in comparison to the prior art, thereby improving performance characteristics of the head assembly structure.

As in the prior art, a tongue 5 is provided that is approximately parallel to but spaced apart from the flexure support structure 2 (see FIG. 2a). However, the tongue 5 has a "T" shape, and the ramps 6' that connect the tongue 5 to the outrigger arms 3 join the ends of the outriggers (rather than an inner side) to extensions 8 of the tongue 5. The end of the tongue 5 opposite the extensions 8 is a free-floating section 10.

A slider-read/write head assembly would be mounted to the tongue 5 of the flexure 1 with its longitudinal axis parallel to the longitudinal axis of the flexure 1. As in the prior art, the ramps serve to separate the outriggers 3 from the slider attached to the tongue 5.

The positioning of the ramps 6' to support the tongue 5 with respect to the slider is such that side to side motion of the flexure 1 will induce no or minimal yaw in the slider.

As in the prior art, a gimbal dimple 7 is provided on the tongue 5. In the present invention, the gimbal dimple 7 is preferably positioned along the tongue 5 such that when a slider is mounted on the tongue 5, the dimple 7 is positioned at approximately the center of pressure of the slider, spaced apart therefrom. This helps maintain the proper attitude of the attached slider with respect to the disk surface. As in the prior art, the apex of the dimple 7 rests against a load beam (not shown).

As a result of the inventive design, the position of the gimbaling dimple 7 can be moved substantially forward along the flexure, thereby permitting the use of a notched slider assembly, resulting in an overall decrease in the height of the flexure/slider combination. FIG. 3 shows such a combination. The slider 30 has a portion of its body cut away to form a notch 31 which accommodates the end of the flexure 1. The overall height of the flexure/slider combination is reduced by the height 32 of the notch 31. This is advantageous since it permits closer spacing between disk platters in a disk drive, resulting in a more compact drive or a drive having a greater number of disk platters.

In the preferred embodiment, a number of bonding holes 9 penetrating the tongue 5 are provided to permit better adhesive bonding between a slider and the tongue 5. An adhesive applied between the tongue 5 and a slider will adhere to the slider and flow into the bonding holes 9, thereby providing greater adhesion and mechanical attachment of the slider to the tongue 5. This is particularly important when using very small sliders, since the bonding area between such sliders and the flexure tongue 5 is reduced.

By adjusting the width and length of the connecting ramps 6' and/or the outriggers 3, the compliance of the tongue 5 can be modified to a desired range of values. This permits manufacture of a flexure in accordance with the present invention that has essentially the same or better compliance characteristics compared to prior art flexures.

Figure 4:
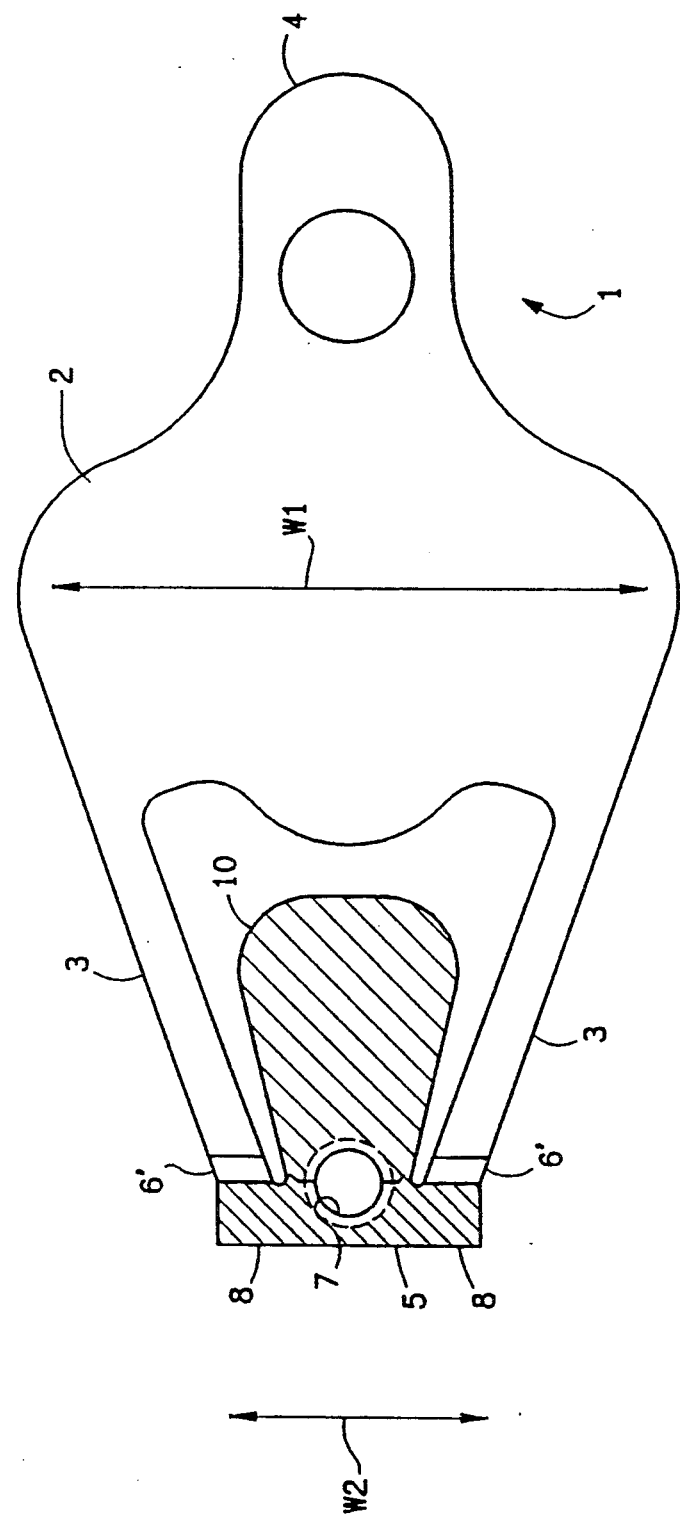
FIG. 4 is a top plan view of a flexure in accordance with an alternative embodiment of the present invention.

FIG. 4 shows a top plan view of an alternative embodiment of the present invention. The flexure structure 1 comprises a "lyre" shaped support structure 2 having an attachment end 4 and a pair of outriggers 3. In contrast to the embodiment shown in FIG. 2, the maximum width W1 of the support structure 2 is larger than the width W2 of the end of the tongue 5. (In the preferred embodiment of this alternative configuration of the invention, the width W1 is approximately 0.15 inches and the width W2 is approximately 0.062 inches). It has been found that the embodiment shown in FIG. 2 exhibits does not eliminate some undesirable yaw resonances in some configurations of the invention. By broadening the beam of the support structure 2 as shown such that the outriggers 3 angle in from the broadened beam of the support structure 2 towards the tongue 5, the undesirable characteristics of such yaw modes are reduced or eliminated.

Because the open space between the outriggers 3 is increased in this embodiment, the free-floating section 10 of the tongue 5 can be broadened. The bonding holes 9 shown in FIG. 2 are generally not necessary in the embodiment shown in FIG. 4 because of the increased bonding area available with the broader tongue 5. However, bonding holes 9 can be added if desired.

In summary, repositioning the connecting ramps 6' from the inner edges of the outriggers 3 as taught by the prior art to the ends of the outriggers 3 provides substantially improved yaw stiffness while allowing the outriggers 3 to be re-sized to give improved pitch and roll compliance. Broadening the maximum width W1 of the support structure 2 to be larger than the width W2 of the end of the tongue 5, such that the outriggers 3 angle in from the broadened beam of the support structure 2 towards the tongue 5, further helps eliminate or reduce undesirable yaw characteristics.

Although the present invention has been described in connection with a particular embodiment thereof, additional embodiments, applications and modifications, which will be obvious to those skilled in the art, are included within the spirit and scope of the invention. For example, the tongue 5 can have a cross-shape instead of a generally "T"-shape. Therefore, this invention is not to be limited to the specific embodiment discussed and illustrated herein, but rather by the following claims.

We claim:

1. A disk drive flexure comprising:
   a. a support structure having an attachment end for connection to a load beam of a disk drive and a pair of spaced-apart outriggers, each outrigger being connected at one end to the attachment end of the support structure and having a distal end with a connection edge approximately perpendicular to the longitudinal axis of the outrigger;
   b. a tongue situated approximately parallel to and spaced apart from the support structure, the tongue having an elongated main body with lateral extensions on either side of the main body and at one end thereof, each lateral extension extending sideways from the main body of the tongue to at least the connection edge of the distal end of one of the spaced apart outriggers, and each having a connection edge approximately parallel to and spaced apart from the connection edge of the distal end of said outrigger; and
   c. a pair of sloped connecting ramps, each coupled (1) at a first end to the connection edge of the distal end of an outrigger such that the horizontal distance between the outer edges of the outriggers at the connection between the ramps and outriggers is less than the horizontal distance between the outer edges of the outriggers at the connection between the support structure and outriggers, and (2) at a second end, opposite the first end, to the connection edge of a lateral extension of the tongue, such that the height of the ramps spaces the tongue apart from the support structure.

2. A flexure for supporting a slider-read/write head assembly in a disk drive and coupling such assembly to a load beam of the disk drive, the flexure comprising:
   a. a support structure having an attachment end for connection to a load beam and a pair of spaced-apart outriggers, each outrigger being connected at one end to the attachment end of the support structure and having a distal end with a connection edge approximately perpendicular to the longitudinal axis of the outrigger;
   b. a tongue situated approximately parallel to and spaced apart from the support structure, the tongue having an elongated main body with lateral extensions on either side of the main body and at one end thereof, for supporting the slider-read/write head assembly, each lateral extension extending sideways from the main body of the tongue to at least the connection edge of the distal end of one of the spaced apart outriggers, and each having a connection edge approximately parallel to and spaced apart from the connection edge of the distal end of said outrigger; and
   c. a pair of sloped connecting ramps, each coupled (1) at a first end to the connection edge of the distal end of an outrigger such that the horizontal distance between the outer edges of the outriggers at the connection between the ramps and outriggers is less than the horizontal distance between the outer edges of the outriggers at the connection between the support structure and outriggers, and (2) at a second end, opposite the first end, to the connection edge of a lateral extension of the tongue, such that the height of the ramps spaces the tongue apart from the support structure.

3. The flexure of claim 1 or 2, wherein the tongue is perforated by at least one bonding hole, the bonding holes permitting an adhesive to flow therein.

4. The flexure of claim 1 or 2, wherein the longitudinal axis of the slider-read/write head assembly is approximately parallel to the longitudinal axis of the support structure and tongue.

5. The flexure of claim 1 or 2, wherein the tongue further includes a gimbal dimple situated such that the apex of the dimple pivotably rests against the load beam.

6. The flexure of claim 5, wherein the gimbal dimple is situated along the tongue such that the apex of the dimple is approximately positioned opposite and spaced apart from the center of pressure of the slider-read/write head assembly.

7. The flexure of claim 2, wherein the togue is "T"-shaped.

8. A flexure and slider-read/write head assembly for use in a disk drive, the assembly comprising:
   a. a support structure having an attachment end for connection to a load beam and a pair of spaced-apart outriggers, each outrigger being connected at one end to the attachment end of the support structure and having a distal end with a connection edge approximately perpendicular to the longitudinal axis of the outrigger;
   b. a tongue situated approximately parallel to and spaced apart from the support structure, the tongue having an elongated main body with lateral extensions on either side of the main body and at one end thereof, for supporting the slider-read/write head assembly, each lateral extension extending sideways from the main body of the tongue to at least the connection edge of the distal end of one of the spaced apart outriggers, and each having a connection edge approximately parallel to and spaced apart from the connection edge of the distal end of said outrigger, and further including a gimbal dimple;
   c. a pair of sloped connecting ramps, each coupled (1) at a first end to the connection edge of the distal end of an outrigger such that the horizontal distance between the outer edges of the outriggers at the connection between the ramps and outriggers is less than the horizontal distancee between the outer edges of the outriggers at the connection between the support structure and outriggers, and (2) at a second end, opposite the first end, to the connection edge of a lateral extension of the tongue such that the height of the ramps spaces the tongue apart from the support structure;

d. a slider-read/write head assembly coupled to and supported by the tongue;

wherein the gimbal dimple is situated along the tongue such that the apex of the dimple is approximately positioned opposite and spaced apart from the center of pressure of the slider-read/write head assembly.

9. The flexure and slider-read/write head assembly of claim 8, wherein the slider-read/write head assembly is notched and the tongue is positioned within the notch.

10. The flexure of claim 8, wherein the tongue is "T"-shaped.

* * * * *